(12) United States Patent
Tweedale et al.

(10) Patent No.: US 11,770,426 B2
(45) Date of Patent: *Sep. 26, 2023

(54) SOFTWARE-DEFINED MEDIA PLATFORM

(71) Applicant: TELEFONAKTIEBOLAGET LM ERICSSON (PUBL), Stockholm (SE)

(72) Inventors: Paul Tweedale, Andover, MA (US); Chin-Cheng Wu, Carlisle, MA (US); Michael Shearer, Somerville, MA (US); Tung Ng, North Andover, MA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 2 days.

This patent is subject to a terminal disclaimer.

(21) Appl. No.: 17/376,087

(22) Filed: Jul. 14, 2021

(65) Prior Publication Data

US 2021/0344733 A1    Nov. 4, 2021

Related U.S. Application Data

(63) Continuation of application No. 16/576,026, filed on Sep. 19, 2019, now Pat. No. 11,070,604, which is a
(Continued)

(51) Int. Cl.
*H04L 65/60* (2022.01)
*G06F 9/455* (2018.01)
(Continued)

(52) U.S. Cl.
CPC .......... *H04L 65/60* (2013.01); *G06F 9/45558* (2013.01); *H04L 41/08* (2013.01);
(Continued)

(58) Field of Classification Search
CPC ..... H04L 65/60; H04L 65/765; H04L 65/764; H04L 67/52; H04L 67/60; H04L 41/08;
(Continued)

(56) References Cited

U.S. PATENT DOCUMENTS

| 6,083,276 A | 7/2000 | Davidson et al. |
| 6,397,181 B1 | 5/2002 | Li et al. |

(Continued)

FOREIGN PATENT DOCUMENTS

| EP | 2619909 A1 | 7/2013 |
| JP | 2007184913 A | 7/2007 |

(Continued)

OTHER PUBLICATIONS

Lin, et al.: "The Study and Methods for Cloud Based CDN". Oct. 10, 2011.
(Continued)

*Primary Examiner* — Mohamed A. Wasel
*Assistant Examiner* — John Fan
(74) *Attorney, Agent, or Firm* — SAGE PATENT GROUP

(57) ABSTRACT

A software-defined media platform having one or more media processing units that may be dynamically instantiated, interconnected and configured according to changes in demand, resource availability, and other parameters affecting system performance relative to demand. In one example media processing method, a source media stream may be received via multicast or unicast. The source media stream may be processed into one or more levels of work product segments having different media characteristics by a plurality of transcoding processing units, as needed. One or more levels of work product segments, or the source media stream, may be packaged (e.g., including resegmenting) into final work product segments having select media characteristics, which may be uploaded to a cloud storage unit for delivery to end users.

20 Claims, 10 Drawing Sheets

Related U.S. Application Data continuation of application No. 14/510,906, filed on Oct. 9, 2014, now Pat. No. 10,440,080.

(60) Provisional application No. 61/892,733, filed on Oct. 18, 2013.

(51) Int. Cl.

| | | |
|---|---|---|
| *H04L 41/0816* | (2022.01) | |
| *H04L 65/80* | (2022.01) | |
| *H04L 67/02* | (2022.01) | |
| *H04L 67/10* | (2022.01) | |
| *H04N 21/6405* | (2011.01) | |
| *H04N 21/647* | (2011.01) | |
| *H04N 21/845* | (2011.01) | |
| *H04L 65/75* | (2022.01) | |
| *H04L 67/52* | (2022.01) | |
| *H04L 67/60* | (2022.01) | |
| *H04L 41/08* | (2022.01) | |
| *H04L 41/0654* | (2022.01) | |
| *H04L 41/5019* | (2022.01) | |

(52) U.S. Cl.
CPC ........ *H04L 41/0816* (2013.01); *H04L 65/764* (2022.05); *H04L 65/765* (2022.05); *H04L 65/80* (2013.01); *H04L 67/02* (2013.01); *H04L 67/10* (2013.01); *H04L 67/52* (2022.05); *H04L 67/60* (2022.05); *H04N 21/6405* (2013.01); *H04N 21/64738* (2013.01); *H04N 21/64761* (2013.01); *H04N 21/64769* (2013.01); *H04N 21/8456* (2013.01); *G06F 2009/45562* (2013.01); *H04L 41/0654* (2013.01); *H04L 41/5019* (2013.01)

(58) Field of Classification Search
CPC ..... H04L 41/0816; H04L 65/80; H04L 67/02; H04L 67/10; H04L 41/0654; H04L 41/5019; G06F 9/45558; G06F 2009/45562; H04N 21/6405; H04N 21/64738; H04N 21/64761; H04N 21/64769; H04N 21/8456

USPC .......................................... 709/219
See application file for complete search history.

(56) References Cited

U.S. PATENT DOCUMENTS

| | | | |
|---|---|---|---|
| 6,407,680 B1 | 6/2002 | Lai et al. | |
| 6,611,537 B1 | 8/2003 | Edens et al. | |
| 7,934,239 B1 | 4/2011 | Dagman | |
| 8,161,478 B2 | 4/2012 | Seguin et al. | |
| 8,813,245 B1 | 8/2014 | Corley et al. | |
| 8,995,534 B2 | 3/2015 | Richardson et al. | |
| 9,241,204 B2* | 1/2016 | Li | H04N 21/8456 |
| 9,246,741 B2 | 1/2016 | Eswaran et al. | |
| 2009/0328228 A1 | 12/2009 | Schnell | |
| 2010/0158126 A1* | 6/2010 | Bai | H04N 19/15 |
| | | | 375/E7.198 |
| 2012/0102154 A1 | 4/2012 | Huang et al. | |
| 2012/0151111 A1* | 6/2012 | Jung | G06F 9/45558 |
| | | | 710/263 |
| 2012/0331150 A1 | 12/2012 | Rao | |
| 2013/0060911 A1* | 3/2013 | Nagaraj | H04L 65/612 |
| | | | 709/219 |
| 2013/0083848 A1 | 4/2013 | Joch et al. | |
| 2013/0219074 A1 | 8/2013 | Dahl et al. | |
| 2013/0272374 A1 | 10/2013 | Eswaran et al. | |
| 2014/0143823 A1 | 5/2014 | Manchester | |
| 2014/0187239 A1 | 7/2014 | Friend et al. | |
| 2014/0376623 A1 | 12/2014 | Good | |

FOREIGN PATENT DOCUMENTS

| | | |
|---|---|---|
| JP | 2010011511 A | 1/2010 |
| JP | 2011108261 A | 6/2011 |
| WO | 2004040908 A1 | 5/2004 |
| WO | 2006126260 A1 | 11/2006 |
| WO | 2013124790 A1 | 8/2013 |

OTHER PUBLICATIONS

ETSI GS NFV: "ETSI GS NFV 001 V1.1.1 Network Functions Virtualisation (NFV); Use Cases". Oct. 1, 2013.

* cited by examiner

SOFTWARE-DEFINED MEDIA PLATFORM

PRIORITY UNDER 35 U.S.C. § 119(e) & 37 C.F.R. § 1.78

This nonprovisional application is a continuation of U.S. application Ser. No. 16/576,026, filed Sep. 19, 2019, which is a continuation of U.S. application Ser. No. 14/510,906, filed Oct. 9, 2014, now U.S. Pat. No. 10,440,080, which claims the benefit of U.S. Provisional Application No. 61/892,733, filed Oct. 18, 2013, the disclosures of which are fully incorporated herein by reference.

FIELD OF THE DISCLOSURE

The present disclosure generally relates to communication networks. More particularly, and not by way of any limitation, the present disclosure is directed to a software-defined media platform operable in an adaptive streaming environment.

BACKGROUND

Current media delivery platforms, e.g., employed in adaptive streaming environments, are typically very rigid with regard to resources and configuration. Processing resources are allocated in advance for the processing of live or on-demand channels (i.e., ingestion, transcoding, encryption, segmentation and uploading), and once ingestion commences with respect to a media channel it may be difficult or impossible to alter the allocation/configuration of resources for that channel without risking undesirable disruption to downstream consumer viewing sessions. The current model for media delivery platforms does not allow the system to easily and efficiently adapt to variations in demand or underlying resource availability.

SUMMARY

Example embodiments of the present invention may be appreciated in view of the following illustrative use case scenario. Consider a service provider (e.g., a content delivery provider) having to provide a multi-screen service for a number of live channels (e.g., 50 channels), with the size and makeup of the viewer audience being variable depending on the time, day, program, etc. The service provider would like to ensure mobile/cellular communications users, Wi-Fi users as well as users with other broadband access technologies (e.g., cable, satellite, etc.) have a great quality of experience, particularly for some of their top rated shows and sporting events that may be distributed across all of the 50 live channels.

Using a traditional media delivery platform, the service provider must provision each channel with multiple versions or representations of the channel content, i.e., media streams encoded at different bitrates, to support all manners of access technologies (e.g., mobile/cellular communication, Wi-Fi communications, cable access, etc.). While such provisioning may provide the desired quality user experience, it usually comes at a high cost due to low-efficiency usage of the processing resources of the delivery infrastructure. For example, at peak times the allocated resources are fully occupied delivering the desired quality of service, but at other times of low demand the resources may be relatively idle. If the proportion of peak operation is low, there is considerable inefficiency with respect to the provisioned resources.

A software-defined media platform according to an embodiment of the present invention may be configured to facilitate a more dynamic allocation of a service provider's resources to address the foregoing issues. Continuing to refer the above use case, a portion of the channels, e.g., 30 out the 50 channels, could be designated as low volume channels that only require a minimal number of bitrates, thereby saving service provider's resources. During the peak viewing times for such channels, however, additional bitrates and associated processing resources may be added in dynamic fashion. Even the channels that are considered premium may have their resources increased at any time. This may be desirable to handle events having unusually large audiences, such as Sunday Night Football, for example, especially with the demand for high-definition content peaking at scheduled times. Further, more bitrates may be required to ensure that cellular customers are not dropping to unnecessary low bitrates. Additionally, higher bitrates and resolutions may be required to service home Wi-Fi users that are watching the game on HD or Ultra HD display devices.

It should be appreciated that such needs can be accommodated by dynamic allocation of additional processing resources in accordance with the embodiments of the present patent application. Moreover, in order to allow the dynamic behavior of resource allocation, which may be affected by user analytics, service provider capabilities and/or other factors such as bandwidth management policies, service level agreements, etc., the embodiments may be provided with the capability to deploy resources locally and/or in a distributed manner not currently provided by today's solutions.

In one aspect, an embodiment of a software-defined media platform (SDMP) disclosed herein comprises distributed computer hardware including processing circuitry for executing computer program instructions, memory and interconnect for storing and transferring data during processing, and interface circuitry coupling the computer hardware to external devices and sub-systems including one or more data communication networks, the memory storing a plurality of software modules executed by the distributed computer hardware to form corresponding media processing units including one or more transcoder processing units and one or more packager processing units. Each transcoder processing unit (TPU) may include at least a recorder, decoder, encoder, segmenter and an uploader, for (a) receiving and decoding an input media stream, (b) segmenting a resulting decoded media stream into segments, and (c) uploading the segments to one or more private or internal cloud storage service units (CSUs), e.g., a private or internal content delivery network. Each packager processing unit (PPU) includes at least a recorder, segmenter and an uploader, for (a) retrieving input segments of source media, (b) re-segmenting the retrieved segments to generate output segments to be delivered to an end consumer, and (c) uploading the output segments to an external cloud storage service unit (e.g., a public content delivery network) that is accessible by the end consumer to obtain the output segments therefrom for playback of the media stream. In a further variation, it is also possible that a PPU could receive a source input (e.g., multicast UDP) instead of segments from an internal CSU. In some example implementations, uploading may be preceded by encryption of the output segments, and may therefore include an encryption service. Accordingly, an example embodiment may include uploading by the media processing units that also involves suitable encryption services. The software-defined media platform further includes a system manager subsystem operative to dynamically instantiate and configure the media processing units and respective connections therebetween to adapt operation according to changes in changes in demand, resource availability, and other parameters affecting system performance relative to demand.

In another aspect, an embodiment of a media processing system operative to process a source media stream into final work product segments for delivery to one or more end users is disclosed. The claimed embodiment comprises, inter alia, an input processing unit configured to segment the source media stream into a stream of base work product segments, wherein each base work product segment has a select time duration and is transcoded to have a base bitrate. A cascading network of a plurality of transcoding processing units (TPUs) are provided, wherein a TPU is operative to (i) process the base work product segments into a first level intermediary work product segment stream, or (ii) process an $i^{th}$ level intermediary work product segment stream into an $(i+1)^{th}$ level intermediary work product stream such that the $i^{th}$ level intermediate work product segments have a bitrate that is higher than the $(i+1)^{th}$ level intermediary work product segments. One or more packager processing units (PPUs) may be configured to process one or more of the base work product segment stream and/or intermediary work product segment streams into the final work product segments having select multiple bitrates and segment sizes (i.e., durations or lengths). One or more cloud storage/service units (CSUs) are operatively coupled to the input processing unit, plurality of TPUs and the one or more PPUs for facilitating storage and transport of the stream of base work product segments and one or more intermediary work product segment streams. An orchestration and resource management (ORM) unit is provided operative to dynamically instantiate and configure the input processing unit, plurality of TPUs, the one or more PPUs and respective connections therebetween via the one or more CSUs in order to adaptively process the source media stream responsive to one or more configuration triggers.

In yet another aspect, an embodiment of a media processing method is disclosed for processing a source media stream into final work product segments for delivery to one or more end users. The claimed embodiment comprises, inter alia, receiving the source media stream and processing the source media stream into one or more levels of work product segments having different media characteristics by a plurality of TPUs that may be dynamically instantiated and configured responsive to one or more configuration triggers. The claimed embodiment further comprises packaging (e.g., including resegmenting where needed) the one or more levels of work product segments into the final work product segments having select media characteristics and uploading the final work product segments by one or more PPUs for delivery to the one or more end users or consumers. Similar to the TPUs, the PPUs may also be dynamically instantiated and configured responsive to one or more configuration triggers. In one implementation, the TPU/PPUs may be architected in one of a custom hardware implementation, a software implementation, a single-rooted input/output virtualization (SR-IOV) arrangement and a multi-rooted input/output virtualization (MR-IOV) arrangement. The one or more configuration triggers may be generated responsive to, e.g., at least one of: (i) network analytics relative to the delivery of the final work product segment streams to the end users, (ii) service operator-initiated alarms, (iii) hardware or software failures, (iv) an Electronic Program Guide (EPG) containing scheduling information of the source media stream (106) in a geographical area. In a further implementation, the select media characteristics of the work product segments may comprise at least one of multiple encoding bitrates, segment sizes (i.e., length or duration) and frame rates.

In still further aspects, additional or alternative embodiments of methods operative at one or more TPUs, PPUs and/or the ORM subsystem may be provided in accordance with the teachings herein. In still further related aspects, embodiments of non-transitory tangible computer-readable media containing program instructions or code portions stored thereon are disclosed for performing one or more distributed processes, methods and/or schemes set forth herein.

In view of the foregoing, those skilled in the art will appreciate that the embodiments set forth herein advantageously provide dynamic instantiation of processing resources allocated to a media delivery environment. In particular, using dynamic resource instantiation in conjunction with usage information (e.g., analytics) according to an embodiment of the present disclosure may allow a service provider to better maximize its investment, among other benefits.

Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
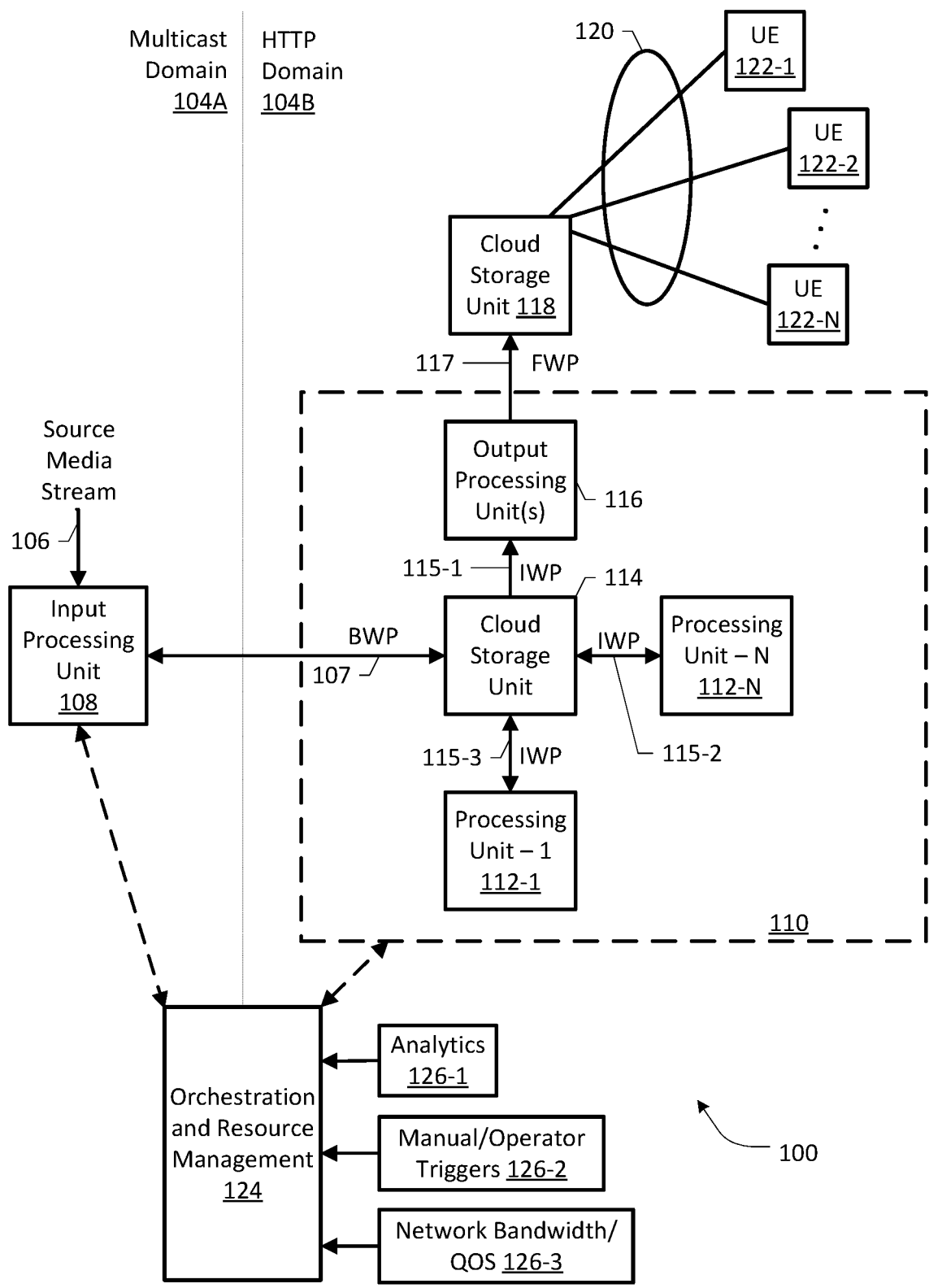
FIG. 1 depicts the overall architecture of an example software-defined media platform (SDMP) for adaptively processing source media streams according to an embodiment of the present patent application.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a media processing element or node may be comprised of one or more pieces of service equipment, including hardware and software, virtualized or otherwise, that communicatively interconnects other equipment on a network (e.g., other network elements, end stations, etc.), and may be dynamically instantiated and configured adaptive to various usage and network conditions. End user stations, also referred to as subscriber end stations, client devices or user equipment, may comprise any device configured to execute, inter alia, at least one client application (e.g., an ABR streaming client application) for receiving content from a streaming server or content provider in accordance with a streaming application specification. Accordingly, example client devices may include set-top boxes, personal/digital video recorders (PVR/DVRs), workstations, laptops, netbooks, palm tops, mobile phones, smartphones, multimedia phones, networked projectors or media players, mobile/wireless user equipment, IP-compliant High Definition (HD) or Ultra HD TV terminals, portable media players, location-aware subscriber equipment, gaming systems or consoles (such as the Wii®, Play Station 3®, Xbox 360®), etc., that may access or consume live or on-demand content/services provided over a delivery network (e.g., an IP network) wherein the media may be processed in a software-defined platform in accordance with one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a network element, media processing unit, a system management node, or a subscriber station, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database (s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is a generalized architecture of an example software-defined media platform (SDMP) 100 for adaptively processing source media streams according to an embodiment of the present patent application. First, an overall framework for the example SDMP architecture 100 is immediately set forth below. In accordance with the teachings of the present disclosure, an embodiment of the SDMP architecture 100 employs software-implemented "processing units" that will be described in more detail further below. An important aspect of the SDMP architecture 100 is to allow the overall processing to be broken up into distinct parts that can easily communicate and transfer data among themselves. This is facilitated by initial processing of a source stream 106 emanating from a domain, e.g., multicast domain 104A, into segments or base work products (to the extent necessary), which become identified as "resources" in the HTTP domain 104B of a service provider environment that may be stored in association with URIs/URLs usable to store and retrieve the segments during further processing. This initial processing is indicated by an input processing unit (IPU) 108 disposed in the multicast domain 104A of the overall architecture shown in FIG. 1. In one embodiment, the source stream is an MPEG-TS stream, provided via multicast or unicast. In other embodiments, other specific stream types may be employed. In still further embodiments, the source stream may be encrypted and/or encoded as well as segmented or unsegmented.

In the present context, a "segment" or "intermediary work product" or "base work product" refers to a contiguous portion of a media item having a duration (or, equivalently, length) that balances transmission efficiency (generally promoted by longer segments) and flexibility for adapting to variable delivery conditions (e.g., available network bandwidth, transitions between access technologies, e.g., cellular and Wi-Fi, etc., generally promoted by shorter segments). In one example implementation, segments may have a duration in the range from about 1 second to about 10 seconds. In some embodiments or operating conditions, durations could potentially be shorter or longer.

In current systems, a service provider may typically have a central office that contains all the live channels in a Multicast MPEG-TS format, and a single transcoding processing unit (executing on a media platform) is operative to convert a channel into the HTTP domain, e.g., HTTP Live Streaming (HLS), DASH or HDS segments. On the other hand, the disclosed SDMP architecture allows for the existence of the media stream in a segmented format, for example at various levels of granularity, that can be accessed via HTTP, which facilitates processing by other processing units to create more bitrates and re-segmented sizes (i.e., durations) for final delivery in a more efficient and dynamically configurable manner.

To facilitate storage and transfer of the segmented work products, a cloud storage/delivery service network may be advantageously employed. One skilled in the art will recognize that the cloud storage may be implemented as a private, public, or hybrid network, in a distributed manner or otherwise. For example, CSU 114 in FIG. 1 refers to a "cloud storage unit", i.e., a cloud service or content delivery network particularly tailored to storing media content items and delivering them to a potentially large number of concurrent and/or downstream consumers (using multicast delivery techniques, for example).

It should be appreciated that the SDMP architecture 100 facilitates high-performance streaming of a variety of digital assets or program assets as well as services (hereinafter referred to as "media content"), including live media programming and/or on-demand content using HTTP. In general, the terms "media content" or "content file" (or, simply "content") as used in reference to at least some embodiments of the present patent disclosure may include digital assets or program assets such as any type of audio/video content that may comprise live capture media or on-demand media, e.g., over-the-air free network television (TV) shows or programs, pay TV broadcast programs via cable networks or satellite networks, free-to-air satellite TV shows, IPTV programs, Over-The-Top (OTT) and video-on-demand (VOD) or movie-on-demand (MOD) shows or programs, time-shifted TV (TSTV) content, etc. Accordingly, source media stream 106 in FIG. 1 may comprise any such stream, which is initially processed by the input processing unit (IPU) 108 to generate base segments or work products 107 as pointed out above. In one implementation, IPU 108 may process the source media stream 106 to generate base segments or work products (BWP) 107 that comprise select media characteristics, e.g., a select segment length/duration, frame rate and encoded/transcoded at a base bitrate, and the like. A plurality of processing units 112-1 to 112-N coupled to one or more CSUs 114 may process the base segment stream 107 into additional intermediary work products (IWPs) at multiple levels, wherein the segments may have different media characteristics, which are illustratively shown as IWP 115-1 to 115-3 in FIG. 1.

One or more output processing units (OPUs) 116 may be dynamically configured to access input streams, BWP streams and/or various levels of IWP streams and process them for packaging and uploading the segments as final work products (FWP) 117 having desirable media characteristics, which may be uploaded to a CSU 118 for delivery to one or more end user equipment or devices, e.g., UE 122-1 to UE 122-N, via suitable streaming delivery infrastructure 120 associated with CSU 118. The output processing units 116 are also responsible for generating appropriate manifest files with respect to the final segments and for facilitating segment synchronization and frame alignment. In addition, appropriate timing information relative to the final segments, e.g., Stream Access Point (SAP) information, Program Clock Reference (PCR) values, Presentation Time Stamp (PTS) values, and Decoding Time Stamp (DTS) values, etc., may also be provided by the output processing units 116. One skilled in the art will recognize that the uploaded FWP segments may be accessed in a suitable adaptive bitrate (ABR) streaming environment compliant with at least one of Moving Picture Expert Group (MPEG) Dynamic Adaptive Streaming over HTTP (MPEG-DASH) specification, HTTP Live Streaming (HLS) specification, Silverlight® Smooth Streaming specification and HTTP Dynamic Streaming (HDS) specification, etc.

In general, various processing units of the SDMP architecture 100 may be categorized into either transcoding/transcode processing units (TPUs) or packager processing units (PPUs), chiefly depending on their respective functionalities. In one sense, if a processing unit is operative to process an input stream to generate one or more output streams having bitrate(s) different than the input stream's bitrate, such a processing unit may be referred to as a TPU. Accordingly, in some implementations, an incoming processing unit (e.g., IPU 108) may comprise a PPU or a TPU. For instance, where the source media stream 106 is already segmented and encoded at a bitrate that is going to be the final work product's bitrate, there will be no need to transcode that stream and therefore a PPU may be configured to operate as IPU 108. On the other hand, if the source media stream 106 needs encoding or transcoding, a TPU may be provided to operate as IPU 108. As to the output processing functionality of SDMP 100, it is generally performed by multiple PPUs, which may be organized in a master/slave relationship wherein a master PPU is synchronized to one or more slave PPUs to promote failover redundancy as well as efficient uploading of FWPs to multiple CSUs 118. In some instances, one or more PPUs may be operative as autonomous units (with segments being created independently). It should be appreciated that it is also possible that a PPU operating as both IPU and OPU could receive a source input (e.g., multicast UDP) instead of segments from the internal CSUs (i.e., BWP streams and/or IWP streams). Remaining processing units 112-1 to 112-N are in general comprised of TPUs (and therefore may be referred to as intermediary TPUs where IPU 108 is also a TPU) which may be organized in a distributed network, e.g., as a cascading network, each operating to receive an input stream and process it to generate output streams having a different set of media characteristics. Accordingly, an intermediary TPU may be thought of as a processing unit operative to (i) process the base work product segments 107 into a first level IWP stream, or (ii) process an $i^{th}$ level IWP stream into an $(i+1)^{th}$ level IWP stream such that the $i^{th}$ level work product segments have a bitrate that is higher than the $(i+1)^{th}$ level work product segments, where i=1 to N. In additional/alternative embodiments, a TPU may operate to change an input's other media characteristics instead, e.g., the bitrate may remain the same but the frame rate and/or resolution may be transformed. In such scenarios, the characteristics of $i^{th}$ level work product segments and $(i+1)^{th}$ level work product segments may have other relationships similar to the bitrate relationships, mutatis mutandis.

Further, the SDMP architecture 100 shown in FIG. 1 includes an orchestration and resource management (ORM) system or subsystem 124 that may be operable as an overall system management entity that is responsible for monitoring and controlling system operation, including the creation and destruction of processing units (i.e., dynamic instantiation), claiming and releasing system resources (e.g., hardware computing resources) for different uses, configuring processing units both internally (i.e., customizing their operation for a specific task, e.g., a particular bitrate encoding) and externally (i.e., connecting inputs and outputs of processing units together to achieve desired higher-level flows or functions, such as respective processing chains for a set of distinct bitrates, etc.), preferably according to triggering factors such as, e.g., changes in demand, resource availability, other parameters affecting system performance relative to demand, and the like. Depending on a particular implementation, the range and combination of triggering factors may vary quite a bit and may be grouped as, e.g., network analytics 126-1 (usage relative to the delivery of the final work product segment streams to the end users, for instance), service operator-initiated signals or alarms 126-2, which may be manual or otherwise, signals generated responsive to hardware/software failures or service failures (e.g., power outage, hardware crashes or other malfunctions, etc.) with respect to the various entities of a specific SDMP configuration. In a further implementation, static conditionalities based on program availability (for instance, based on an Electronic Program Guide (EPG) containing scheduling information of the channel or source media stream in a particular geographical area) as well as network bandwidth usage and Quality of Service (QoS)-based criteria 126-3 may operate to generate appropriate triggers. In a still further implementation, predictive modeling of content consumption may be employed to anticipate demand spikes relative to certain programs, which may depend on subscriber demographics, etc. and may operate to provide adaptive feedback control signaling to ORM 124 so as to instantiate and configure suitable TPUs and PPUs in a proactive manner. In one example embodiment, ORM subsystem 124 may be software-implemented and use either dedicated computer hardware (e.g., either distributed or standalone computers, servers, etc.) or share the same computer hardware with the processing units themselves. Further details regarding the processing units, ORM subsystem and potential SDMP configurations will be set forth below.

It should be appreciated that the TPUs and PPUs set forth above may be provided as basic building blocks of the SDMP architecture 100, wherein the processing units can be realized or virtualized in software, hardware, and/or in any combination thereof. In general, such processing units may comprise software-implemented units, e.g., suitable computer hardware executing instructions of certain application programs to provide the described functionality. For example, a component or subcomponent such as a recorder may be constituted by computer hardware executing instructions of a recorder application program for providing the recorder-related functionality described below. A processing unit (TPU or PPU) preferably includes a defined set of application programs that inter-operate to translate media and move it from one stage to another, e.g., from an ingestion point to a point of packaging and delivery, etc. Generally, the components and/or subcomponents of a given processing unit may be formed by a set of tightly-coupled computer hardware, such as a single server computer for example. However, different processing units may be located on different computing hardware (e.g., different servers) or on shared computing hardware (e.g., multiple processing units on a single server). One skilled in the art will recognize that such abstracting of processing units from underlying host hardware elements is an advantageous feature of the disclosed embodiments.

Figure 2:
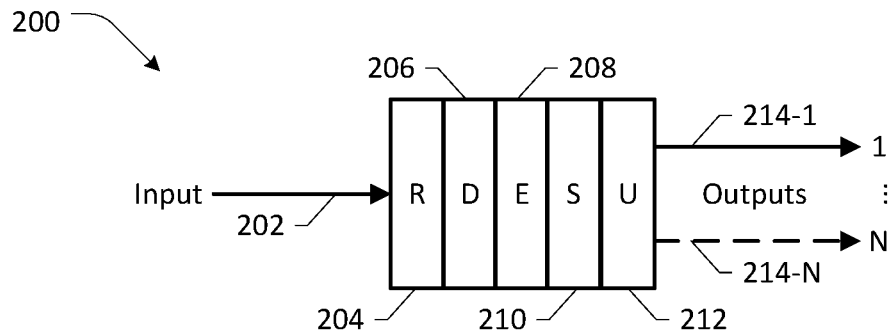
FIG. 2 depicts a block diagram of an example transcoding processing unit (TPU) for use in an embodiment of the SDMP architecture.
Figure 3:
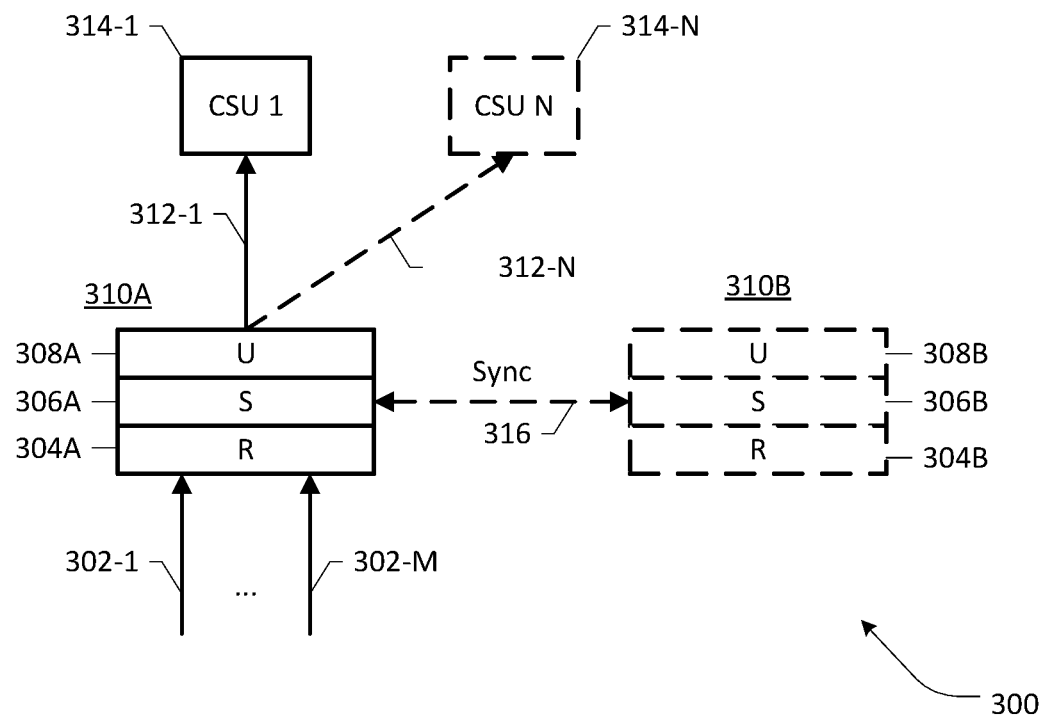
FIG. 3 depicts a block diagram of an example packager processing unit (PPU) provided in a redundant configuration for use in an embodiment of the SDMP architecture.

Turning now to FIGS. 2 and 3, depicted therein are block diagrams of example TPU and PPU subsystems, respectively, according to an embodiment of the present patent application. TPU 200 is illustratively shown in FIG. 2 as comprising a plurality of components or subcomponents, namely, a Recorder (R) 204, a Decoder (D) 206, an Encoder (E) 208, a Segmenter (S) 210 and an Uploader (U) 212. Where used as part of an IPU, Recorder 204 is responsible for download of source media (e.g., Multicast, FTP, HTTP, etc.). In an intermediary TPU implementation, Recorder 204 is operative to receive an input stream from an upstream unit, including any IWP streams, via a CSU. It may also provide a decryption service if and when needed. Decoder 206 is operative to provide video decode service for a source stream, e.g., either live or VOD content. Encoder 208 is operative to provide video encode service for one or more bitrates (e.g., ranging from 500 Kbs to 2.5 Mbs). Segmenter 210 provides applicable segmentation services (e.g., HLS segments and m3u8 files, Smooth Streaming, etc.). Uploader 212 is operative to provide encryption and upload services to one or more CSUs, as may be dictated by operational conditions and requirements.

TPU 200 preferably allows for multiple types of configurations to be implemented. In one case, a TPU may output only a single bitrate and may be used in combination with other single-output TPUs to generate multiple bitrates in a distributed framework. In other configurations, a TPU may output multiple bitrates to optimize the system from a decode/encode perspective, albeit potentially limiting the distributed nature of the system. By way of illustration, input 202 in FIG. 2 may comprise a source media stream or an IWP stream (having a particular bitrate) and outputs 214-1 to 214-N may comprise N representations of the content transcoded at N different bitrates. It should be appreciated that TPU 200 is a fundamental building block within the SDMP architecture of the present invention, which can preferably be deployed using either local hardware (e.g., computers coupled by local networks in a central office) and/or in a distributed cloud based environment (e.g., using computers located in separate offices or data centers interconnected by wider-area networks).

It is preferable that the performance of the TPU in a given system be well understood, either by analysis, testing or dynamic evaluation on a given platform (e.g., by execution of an embedded test suite). Decisions on what resources are available and how they will be deployed in the system may be based on the understood performance of the TPU. As a general matter, it may be required that a TPU process a stream at least at real-time speed, and preferably somewhat faster to provide margin. A TPU not meeting the real-time requirement for a given stream may be useful in other ways, e.g., for processing a lower-bitrate stream or for a non-real-time use such as vaulting/archival. A TPU implementation may also allow for one or more of its sub-systems, for example Decoder 206, to be disabled dynamically. This can allow a system to quickly reduce resource consumption when the associated function is not needed, but then to also quickly reintroduce the function when required by changes in the operating environment of the system. In a still further variation, an example TPU implementation may also be configured to operate in a transmux mode in conjunction with a PPU if required. From the TPU perspective, transmuxing may mean that the video and audio cells of a stream will be untouched and passed on as is. The final conversion to the end user format may be provided by the PPU. Typically, the output of a TPU may comprise MPEG-TS segments of some duration (e.g., either in terms of a time scale, 1-second segments, for instance, or in terms of Groups of Pictures (GOP), a minimum of one GOP or a fraction thereof).

As one skilled in the art will recognize, any segmentation-based system may have an inherent latency equal to at least duration of the segment being generated, before taking into account transfer budgets. A low latency in live linear application is not always required, although there may be some special cases involving motion-rich media such as, e.g., sporting events, where that it is desirable. The SDMP architecture 100 described above allows for TPUs to be fed from the output of another TPU (e.g., daisy chaining or cascading), thus incurring a latency equal to the duration of the source segment being generated at a minimum. This latency can be minimized by in a number of ways. For example, the segment duration generated by the TPUs can be reduced to a minimum of one GOP (typically between 1-3 seconds) or a select fraction of a GOP. The PPUs may then combine the TPU outputs to achieve the final desired segment duration for consumption by the end-user client (typically 10 seconds). Additionally or alternatively, the TPU could generate several or all the necessary bitrates simultaneously when high end or specialized computing resources are available.

FIG. 3 depicts a block diagram of an example implementation of PPUs 310A/310B provided in a redundant configuration 300. Typically, a single PPU comprises the following components: Recorder (R), responsible for download of source media (e.g., HTTP or other protocol), optionally facilitating a decryption service if and when needed; Segmenter (S) for segmentation and synchronization services service (e.g., HLS segments and m3u8 files; Smooth Streaming; etc.); and Uploader (U) for encryption and upload services (to multiple CSUs). In the redundant configuration 300 of FIG. 3, PPU 310A is shown as comprising a Recorder 304A, a Segmenter 306A and an Uploader 308A. Likewise, PPU 310B, which is in a synchronization relationship 316 with PPU 310A, also comprises corresponding Recorder 304B, Segmenter 306B and Uploader 308B. In general, a PPU takes the outputs from one or more TPUs and re-segments them, both from a duration and timestamp synchronization perspective. The final output is then uploaded to one or more CSUs that will be accessed by a consuming device (e.g., an end user device). In one implementation, a PPU may also provide the capability for transmuxing, either of data directly encoded by a TPU or the raw source. Further, a PPU may be configured to handle multiple inputs having different bitrates or just a single input having a select bitrate. To allow scalability across multiple physical platforms, a PPU may be configured to operate in either a master or slave/autonomous mode, with the master ensuring all segments have been uploaded to a CSU before updates are made to m3u8 files etc. It should be appreciated that a master PPU may also be capable of dynamic configuration to upload to multiple CSUs, thereby allowing additional CSU services to be activated at high volume times, etc.

By way of illustration, PPU 310A in FIG. 3 is shown in a master mode operative to receive multiple inputs 302-1 to 302-M, which may be provided by one or more TPUs. Uploader 308A of master PPU 310A is operative to upload final work products or segments of suitable bitrates, etc. to multiple CSUs 314-1 to 314-N via corresponding interfaces 312-1 to 312-N. Those of ordinary skill in the art will recognize that a CSU can simply be a storage service, distributed or centralized, that is used by the SDMP system to move data around and ultimately provide it to the end user. In one implementation, such a service may be configured as a cloud-based service which in turn may look like a traditional CDN service from the outside (e.g., from the end user perspective). In further configurations, a CSU may be provisioned as a private CSU that is used by the SDMP to store and move data between TPUs, PPUs and other external CSUs. The end user devices would not have access to the data contained within the private cloud storage units. The data may or may not be encrypted depending on the overall level of security required for the system. In another configuration, a CSU may be deployed as an external or public CSU that may be used by the system to store the final work products that will be consumed by the end user devices. Typically, this content may be encrypted and protected by suitable Digital Rights Management (DRM) mechanisms. The content may also be duplicated on several CSUs for geographic performance (e.g., so as to optimize the location of edge servers) or redundancy reasons.

Figure 4:
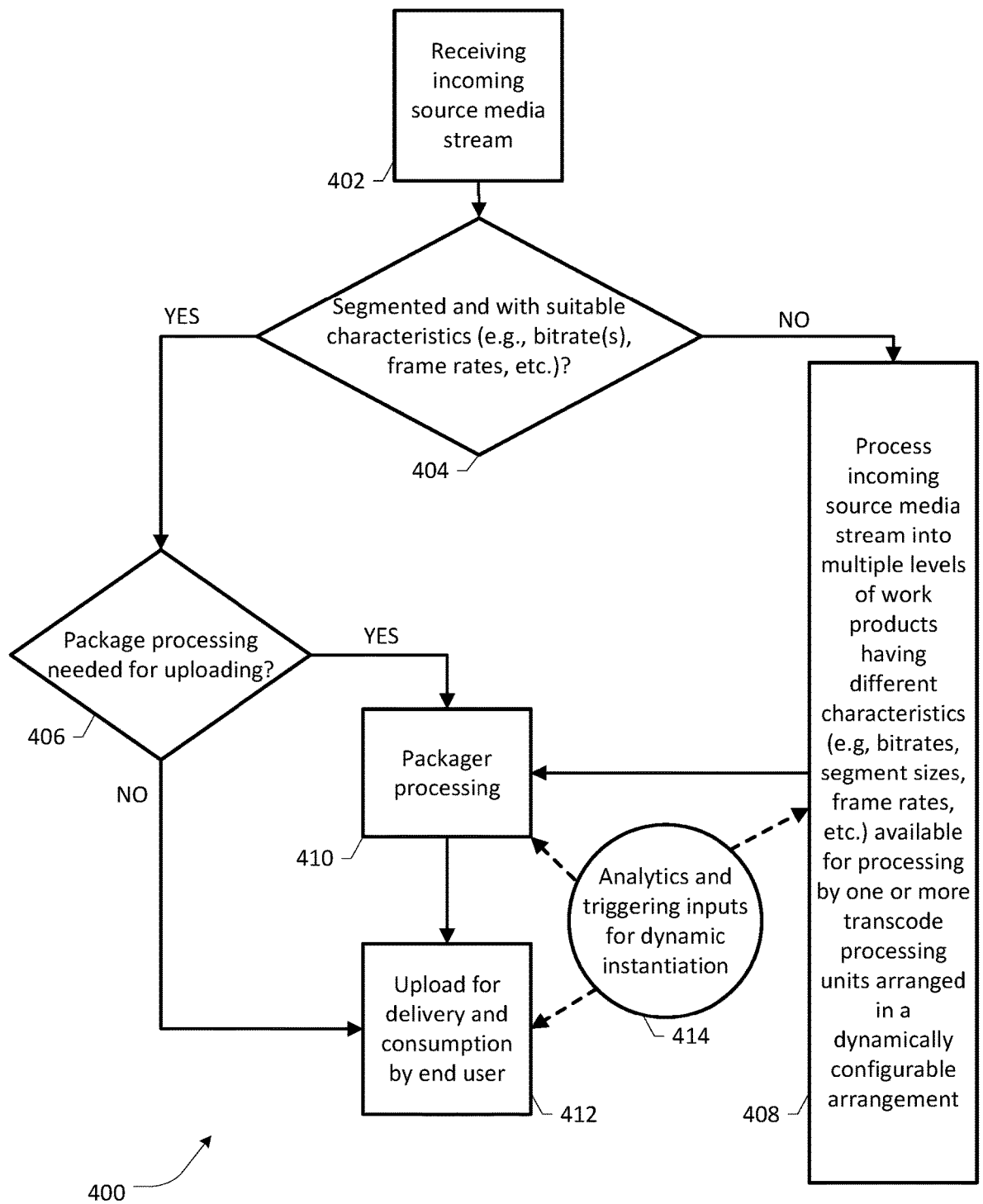
FIG. 4 depicts a flowchart with blocks relative to various functionalities, steps and acts that may be combined in one or more embodiments for executing a source media processing method for purposes of the present patent application.

FIG. 4 depicts a flowchart with blocks relative to various functionalities, steps and acts that may be combined in one or more embodiments for executing a source media processing method 400 for purposes of the present patent application. It should be appreciated that although several blocks/acts are shown in a flow format, not all blocks or acts may be necessary to practice an embodiment hereof. At block 402, an incoming source media stream is received, e.g., by an input processing unit, which may be a TPU or a PPU. One or more determinations may be made with respect to the incoming source media stream's characteristics, e.g., whether the media stream is segmented or unsegmented, encoded and/or encrypted, proper bitrate(s) and frame rate (s), segment size (i.e., duration), etc., which are illustratively shown at the decision block 404. If the incoming media stream has suitable characteristics, a further determination may be whether appropriate packager processing is needed. If so, processing unit(s) may operate in a transmux mode, e.g., process the incoming stream, (re)package and (re) segment it appropriately for uploading the resultant final work products to one or more CSUs. If no packager processing is needed, the incoming media may be minimally processed and uploaded. These functionalities are illustrated by blocks 406, 410 and 412. It should be appreciated that packager processing shown at block 410 may be representative, in an alternative/additional embodiment, of various levels of PPU functionalities operating in concert with other processing units (e.g., TPUs) where additional processing may be required before uploading. Accordingly, if the determination(s) of decision block 404 require(s) that further processing is warranted, the incoming source media stream may be processed into multiple levels of work products having different characteristics (e.g., bitrates, segment sizes or durations, frame rates, etc.). As described hereinabove, such processing may be effectuated by one or more TPUs arranged in a dynamically configurable arrangement (block 408). Packager processing of block 410 may thereafter (re)segment and (re)package the work products into final work products having suitable media characteristics, which may be uploaded for delivery and consumption by end users (block 412). Resources required for TPU processing, PPU processing and uploading (as set forth at blocks 408, 410 and 412) may be dynamically instantiated based on various triggers that operate as feedback control signals for dynamic configuration of the resources, as illustratively shown at block 414.

Figure 5:
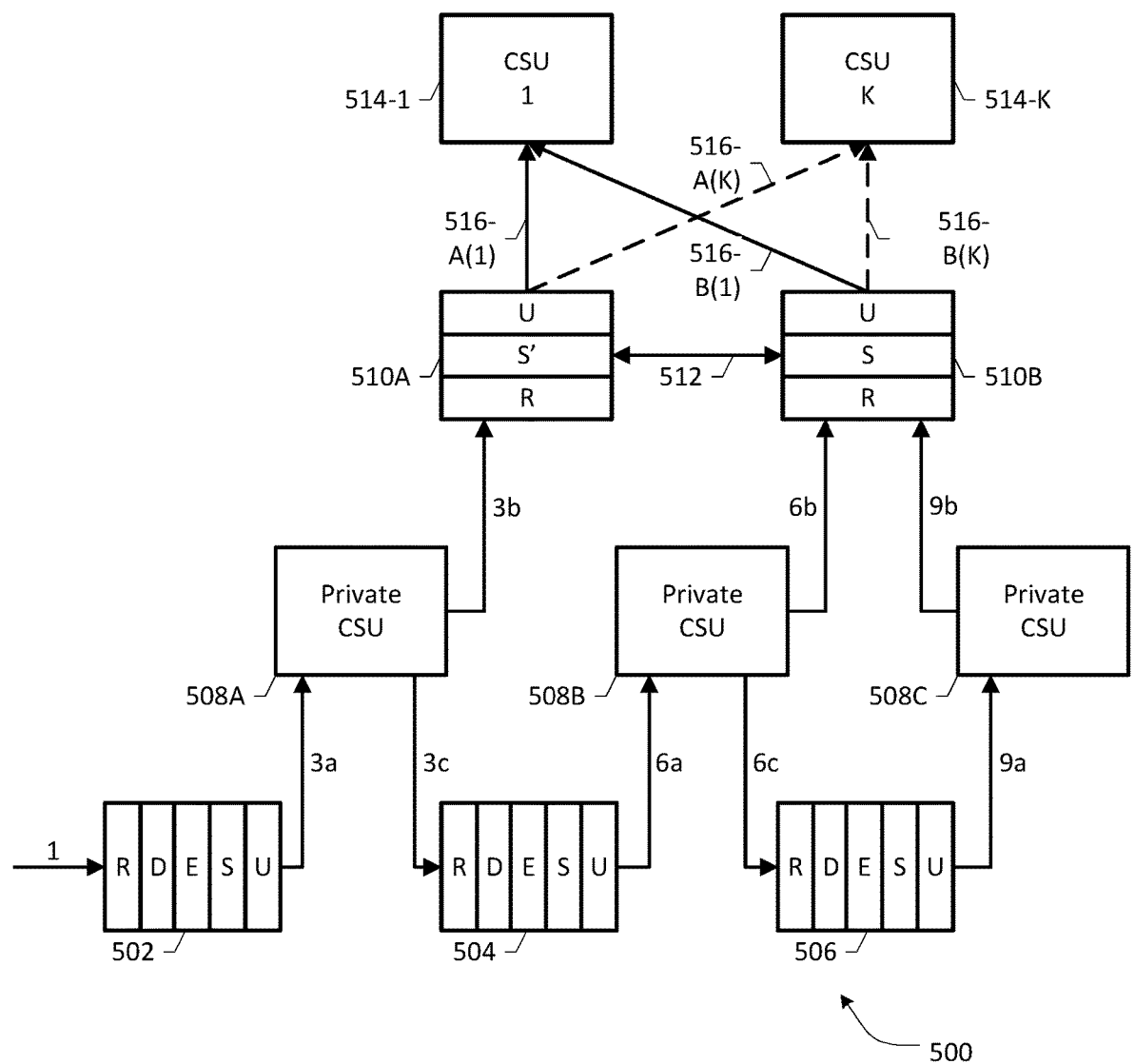
FIGS. 5-7 depict various example configurations wherein an embodiment of a software-defined media platform may be implemented according to the teachings of the present patent application.
Figure 6:
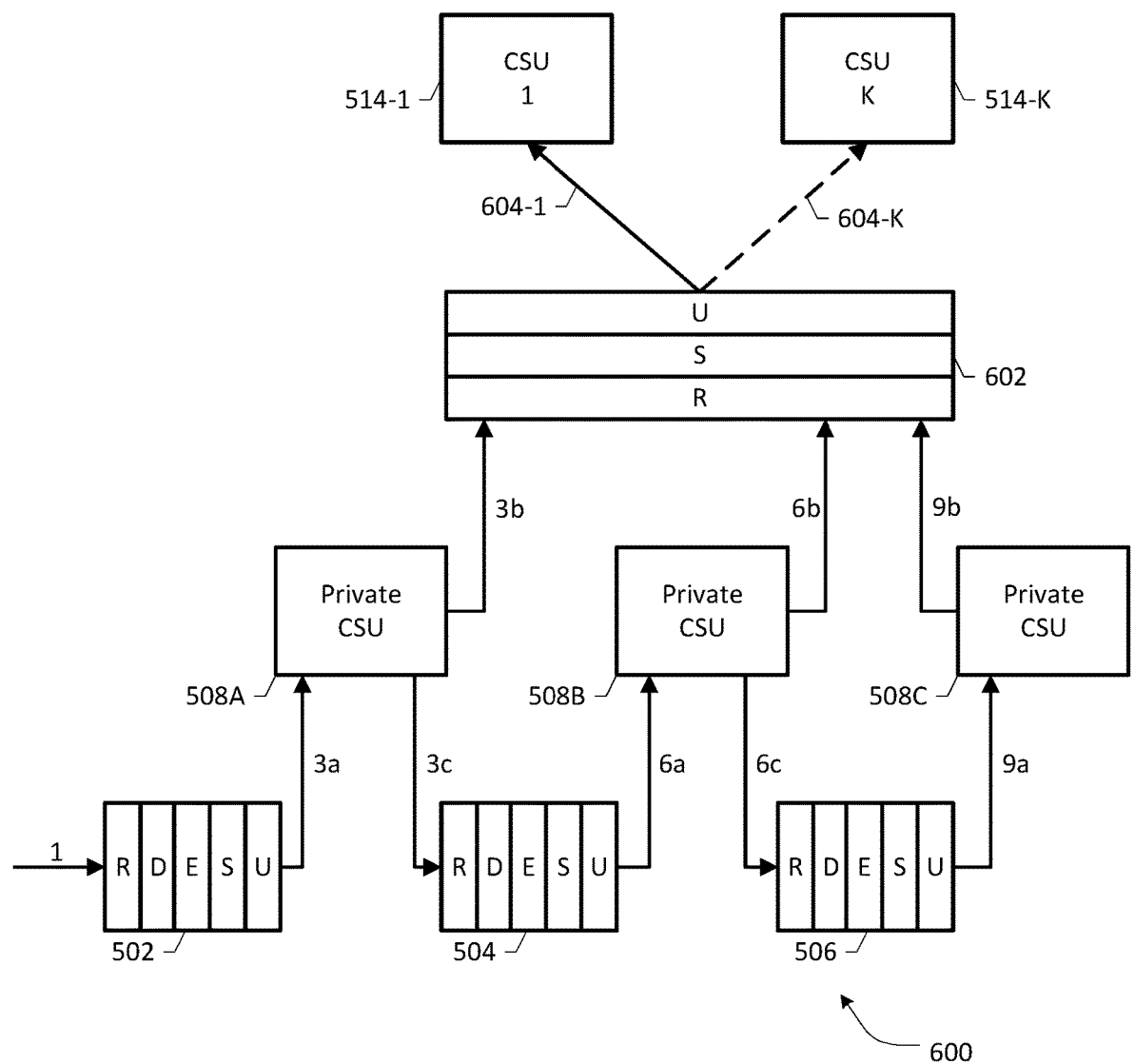
Figure 7:
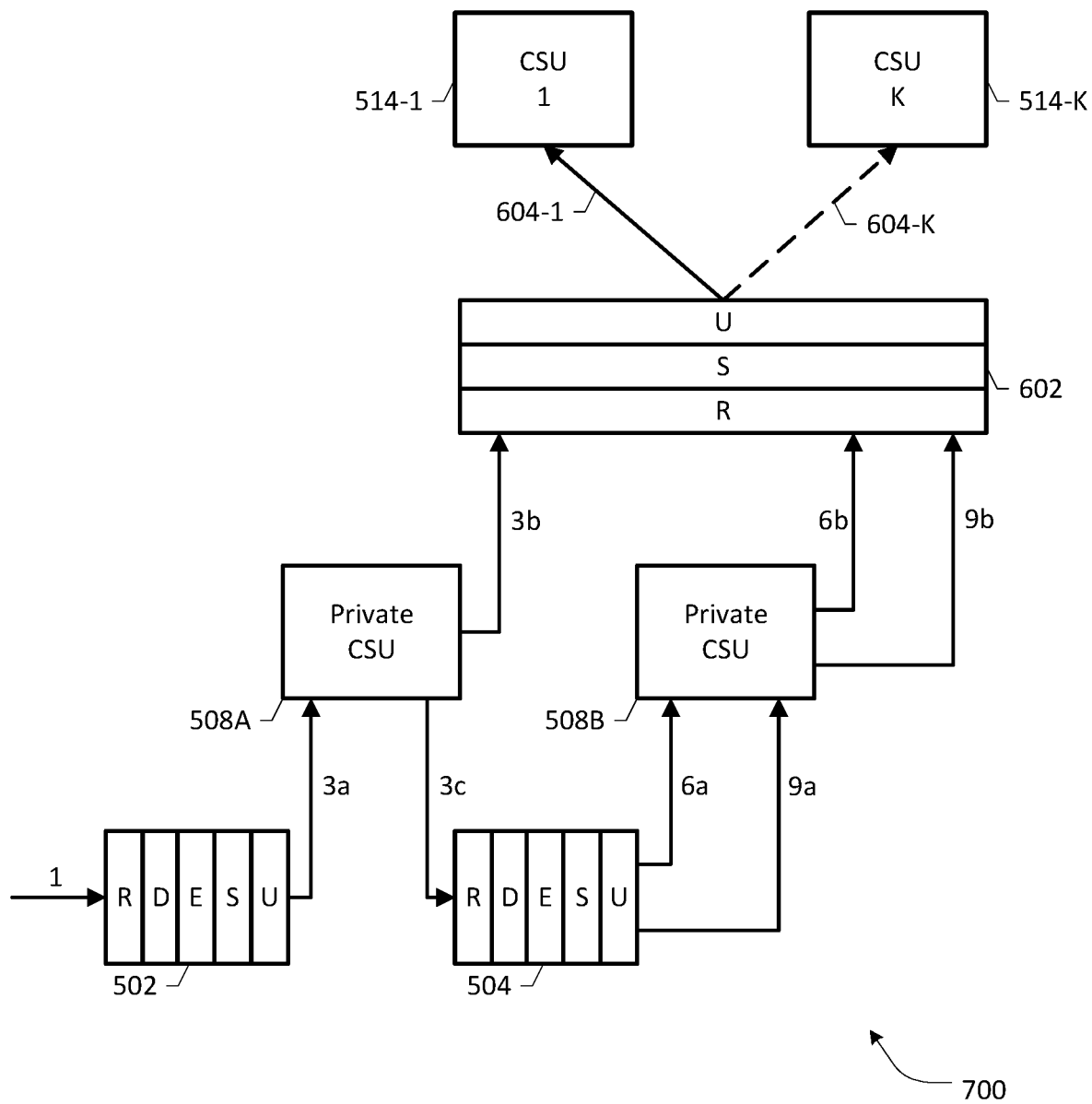

Turning to FIGS. 5-7, depicted therein are various example network environments where an embodiment of a software-defined media platform may be configured according to the teachings of the present patent application. Reference numeral 500 in FIG. 5 is illustrative of a potential configuration for a media delivery system employing exemplary SDMP architecture. In such systems it may be desirable to use a private CSU to allow processing units to share data, in particular, a CSU co-located with the media platform (s) the processing units are executing on. However, it should be appreciated that the CSUs could also be in the cloud or there could be a hybrid configuration. In FIG. 5, reference numerals 508A-508C refer to three representative private CSUs that are disposed between three TPUs 502, 504, 506 and two PPUs 510A, 510B that are provided in a master-slave relationship via synchronization control communications 512. System 500 may be configured to operate on an input source (1), which for a live program is typically a Multicast MPEG-TS stream. TPU 502 receives the source stream (1) and creates segments (3a) of a select duration (e.g., 1-second segments) and bitrate that are consumed by both TPU 504 and the master PPU 510A via private CSU 508A. Additional bitrates may be created by TPUs 504 and 506, which may be consumed by PPU 510B using additional private CSUs 508B and 508C. In terms of bitrate relationships, the bitrate of segments 3a, 3b and 3c may be the same, which may be higher than the bitrate of segments 6a, 6b and 6c, which in turn may be higher than the bitrate of segments 9a and 9b. PPUs 510A, 510B are operative to process these various segments to generate final work product segments of appropriate bitrates, segment durations, etc. for upload and delivery. Typically, one of the PPUs 510A, 510B may be designated to generate the master manifest file(s) relative to the final segments to be uploaded, e.g., PPU 510A. Master PPU 510A is further operative to update the m3u8 control file(s) (e.g., playlists) stored to one or more CSUs 514-1 to 514-K via suitable interfaces 516-A(1) to 516-A(K) once all corresponding segments have been uploaded. By virtue of synchronization effectuated between PPU 510A and PPU 510B via control channel 512, PPU 510B is also operative to upload the files to CSUs 514-1 to 514-K via suitable interfaces 516-B(1) to 516-B(K), should it become necessary to take over.

With respect to TPUs 502, 504, 506, and PPUs 510A-510B, several configurations are possible depending on where they are located. In one arrangement, one or more of TPUs and PPUs of system 500 may be located at a local hardware media platform executing the respective processing functionality (e.g., in a single office or data center). In a cloud arrangement, one or more of TPUs and PPUs of system 500 may be hosted on separate hardware processing resources provided by a cloud service provider (CSP). Accordingly, a range of configurations, including hybrid configurations, may be implemented depending on the TPU/PPU combinations relative to their provisioning. For instance, in one hybrid configuration, TPU 502, TPU 504 and PPU 510A may be located at respective local hardware media platforms whereas TPU 506 and PPU 510B may be supported by a CSP or respective CSPs. Likewise, several other configurations may be advantageously obtained FIG. 6 depicts an example system 600 having a single PPU configuration. FIG. 7 depicts an example system 700 having a multi-bitrate TPU configuration in combination with the single PPU configuration. One skilled in the art will recognize that the description set forth above with respect to system 500 in FIG. 5 is also generally applicable to the embodiments of FIGS. 6 and 7, mutatis mutandis, and therefore will not repeated. With respect to system 600, it should be noted that a single PPU 602 is operative to receive all three IWP segment streams 3b, 6b and 9b via respective CSUs 508A-508C for packager processing and subsequent uploading to CSUs 514-1 to 514-K via corresponding interfaces 604-1 to 604-K. In system 700 of FIG. 7, only two TPUs 502, 504 are provided that are coupled to two CSUs 508A, 508B. TPU 504 is operative to generate two output segment streams 6a and 9a from one input segment stream 3c received via CSU 508A. Both output segment streams 6a and 9b are provided to CSU 508B, which are consumed by single PPU 602 as streams 6b and 9b in addition to segment stream 3b received via CSU 508A.

As pointed out previously, the processing units of an example SDMP architecture may be implemented in numerous ways, e.g., software implementation, custom hardware implementation, etc., as well as utilizing appropriate virtualization techniques. Using a TPU entity as an example, certain I/O virtualization (IOV)-based implementations are set forth immediately below.

Figure 8:
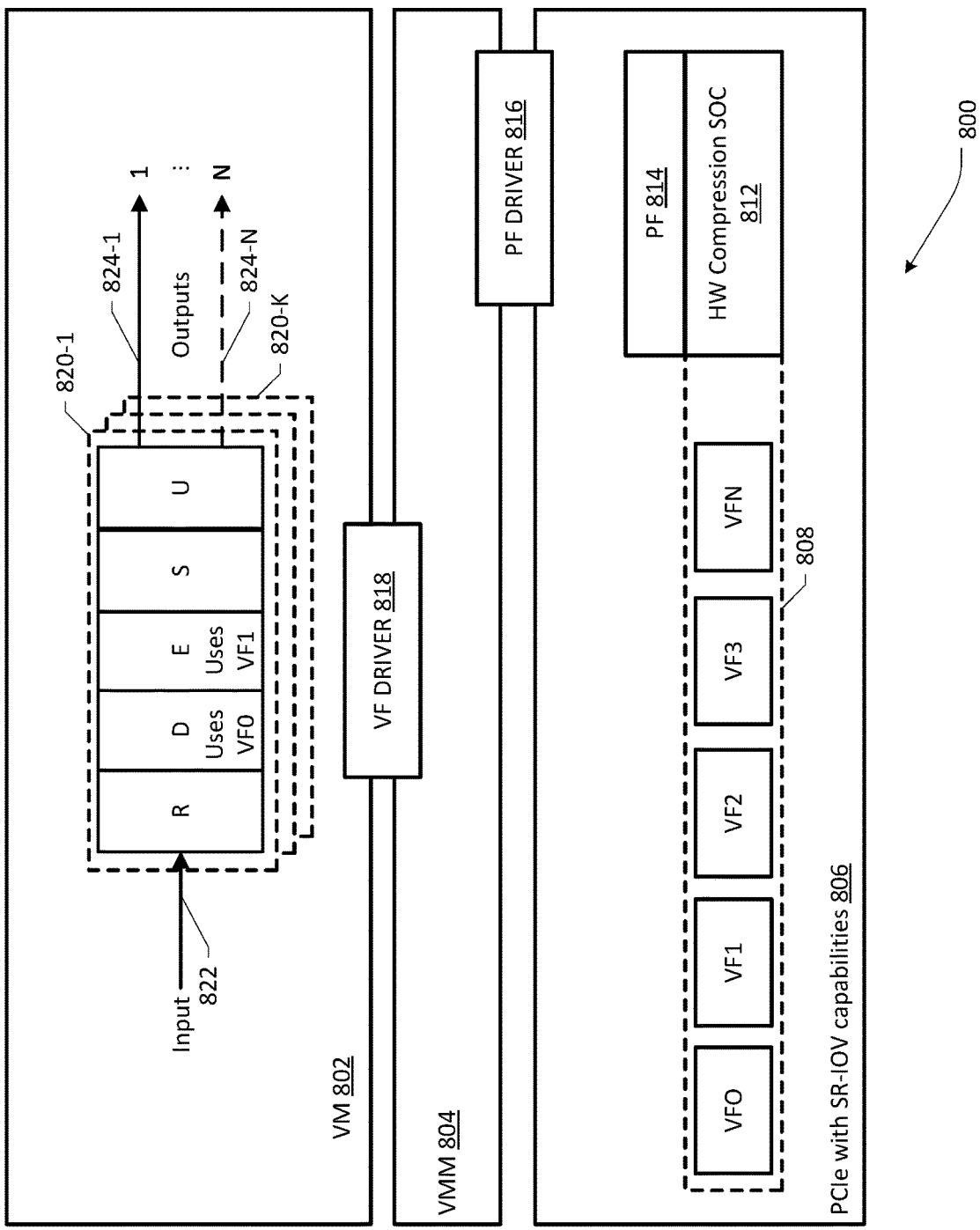
FIG. 8 depicts a virtualization-based implementation of a TPU according to an embodiment.

FIG. 8 depicts a IOV-based implementation of a TPU according to an embodiment. It should be appreciated that the architecture of the TPUs/PPUs disclosed herein allows for an implementation that utilizes I/O virtualization technologies such as, e.g., Peripheral Component Interconnect-Special Interest Group (PCI-SIG) or its variant PCI-SIG Express or PCI-SIGe. In particular, PCI-SIG IOV standardized mechanisms that allow enabled PCIe devices to be directly shared with no run-time overheads may be implemented in a virtualization architecture. Reference numeral 800 refers to a single-rooted IOV (SR-IOV) architecture wherein a Physical Function (PF) Driver 816 is operative to communicate with a Physical Function (PF) 814 on boot to establish and configure capabilities of the underlying SR-IOV capable hardware 806. In one arrangement, the SR-IOV capable hardware 806 may comprise a hardware compression System-on-Chip (SOC) 812 associated with a block 808 of Virtual Functions (VF0 to VFN). A Virtual Machine Monitor (VMM) 804 is operative to provide access to a Virtual Function (VF) driver 818 that allows one or more TPUs 820-1 to 820-K supported in Virtual Machine (VM) environment 802 to utilize the resources. In a typical configuration, a TPU may utilize two VF resources, one for decode and one for encode, to generate a plurality of outputs 824-1 to 824-N from an input 822. In the same distributed VM system 802, other TPUs may just utilize general compute resources for lower quality outputs if required. As will be set forth further below, an Orchestration and Resource Management (ORM) subsystem may be provided to manage the resources available (via the VMM/PF Driver) either in a static or dynamic manner.

Figure 9:
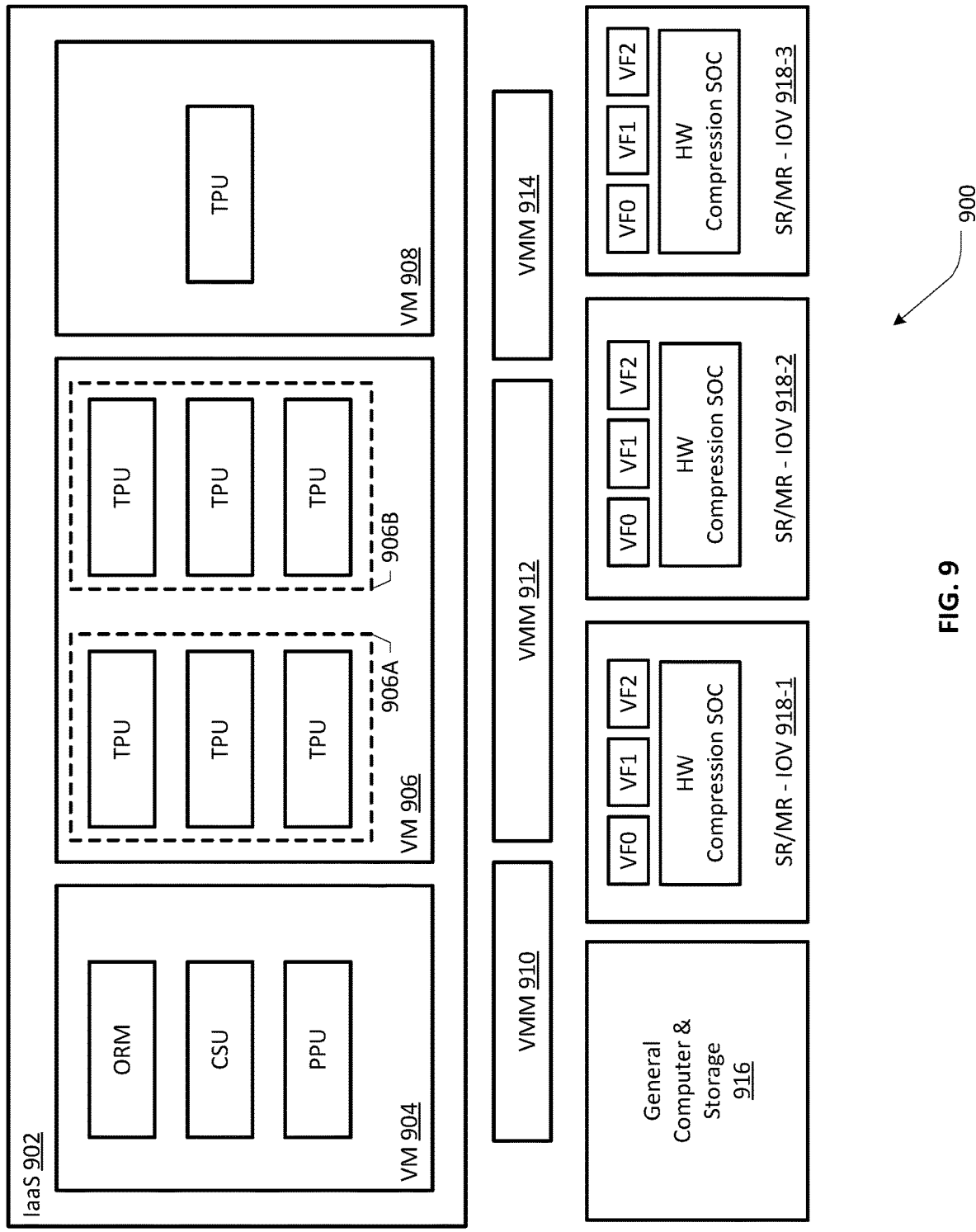
FIG. 9 depicts an IaaS-based implementation of a software-defined media platform according to an embodiment.

In another implementation shown in FIG. 9, an example SDMP architecture 900 may involve both Infrastructure as a Service (IaaS) provisioning model (e.g., OpenStack) and specialized hardware resources, including single- and multi-rooted IOV (SR/MR-IOV) resources. As a virtualized provisioning model, IaaS 902 of the example SDMP is operative to support a plurality of VMs, each executing one or more entities or subsystems of the SDMP. VM 904 is operative to support ORM, CSU and PPU subsystems whereas VM 906 is operative to support a plurality of TPUs. A VM may also support a single TPU, as illustrated by VM 908. Access between IaaS 902 and hardware resources may be facilitated by a plurality of VMMs 910-914. By way of illustration, general compute and storage resources 916 and a plurality of SR/MR-IOVs 918-1 to 918-3 are exemplified, wherein a particular IOV includes hardware compression SOC and associated VF modules. As a further example, VF0-VF2 of SR/MR-IOV 918-1 may support a first block of TPUs 906A while VF0-VF2 of SR/MR-IOV 918-2 may support a second block of TPUs 906B of VM 906. Similarly, a single virtual function, e.g., VF0, of SR/MR-IOV 918-3 may support the single TPU of VM 908.

Figure 10:
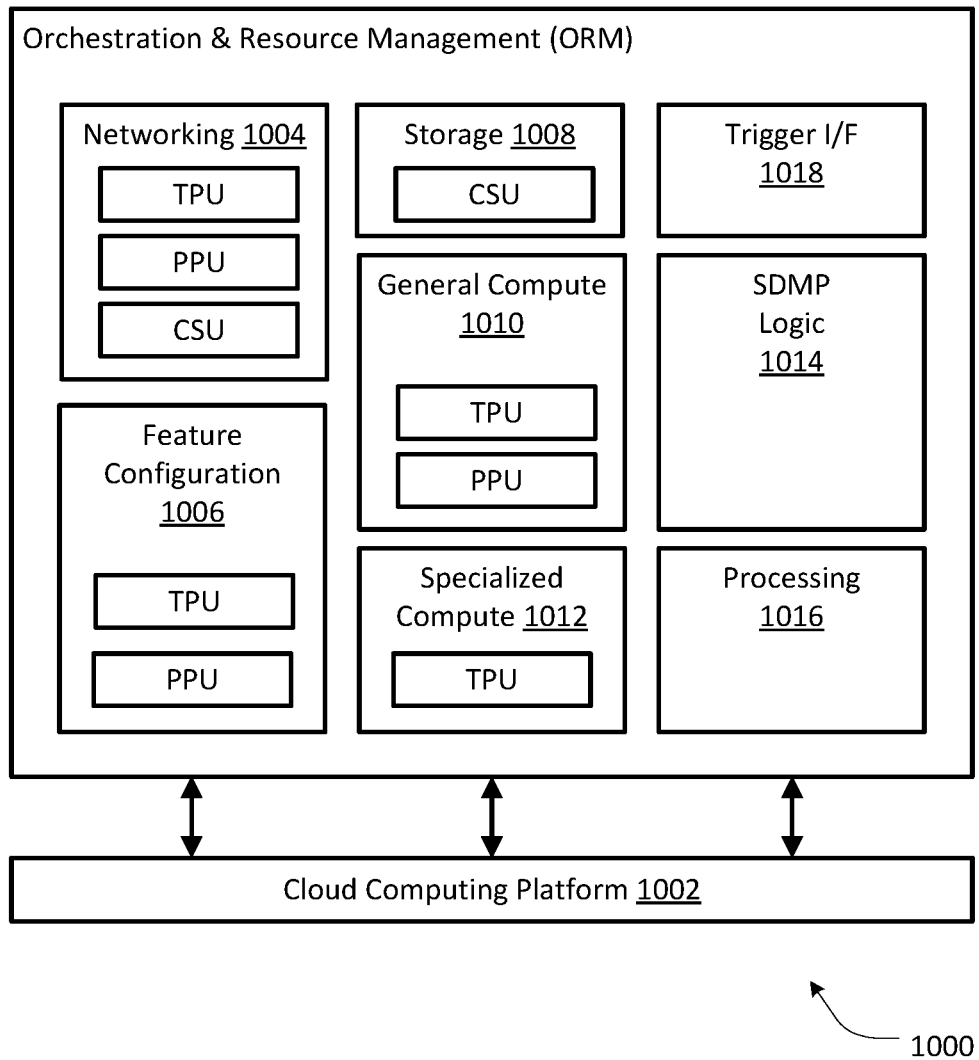
FIG. 10 depicts a block diagram of an orchestration and resource management (ORM) subsystem operative to dynamically instantiate and configure TPUs, PPUs and interconnections therebetween responsive to configuration triggers according to an embodiment.

FIG. 10 depicts a block diagram of example ORM architecture 1000 operative to dynamically instantiate and configure TPUs, PPUs and interconnections therebetween responsive to configuration triggers according to an embodiment. Broadly, ORM architecture 1000 involves provisioning ORM functionality on a cloud computing platform 1002 to facilitate dynamic configuration capability and resource awareness/allocation in the example SDMP system. The ORM architecture 1000 may be configured to leverage the cloud services (e.g., OpenStack) to ensure that appropriate networking, storage, and compute services are allocated to the system consistent with demand, network utilization, QoS, and the like. A networking module or subsystem 1004 of the ORM functionality is responsible for requesting the appropriate TPUs, PPUs and CSUs to be created and configured for the example SDMP in a dynamic manner. Feature configuration 1006, which may be coordinated within the ORM functionality, is operative to support configuring of TPUs and/or PPUs for facilitating certain manipulations of content, e.g., TSTV, network-based video recording (NPVR), etc. For instance, TSTV requires PPUs to be configured to create new program directories and receive in-band or out-band signaling for program creation, which may be facilitated by the feature configuration module 1006. In addition, general compute resources/services 1010 available for TPUs/PPUs and specialized compute resources/services 1012 available for TPUs may be dynamically provisioned by the ORM, which may include dedicated hardware for compression. Where possible, the resources may be virtualized (via technologies such as SR-IOV and MR-IOV as described above) in order to maximize their usefulness.

The ORM functionality may further include appropriate SDMP service logic 1014 stored in nonvolatile memory to instantiate and configure the various resources as well as effectuate an embodiment of a media processing methodology (e.g., as set forth in FIG. 4) using suitable hardware, e.g., processing 1016. Additionally, appropriate network interfaces (I/F) 1018 may be provided for facilitating communication of control signals, including configuration trigger signals that may act as inputs to the SDMP logic 1014.

It should be appreciated that an example SDMP system utilizing the ORM architecture 1000 may be configured to define a dynamic quality of service for a particular channel ahead of time. For example, the ORM functionality may be responsible for reallocating resources based on thresholds, requests, traps and external events. By way of illustration, the ORM functionality may perform one or several of the following:

(i) Set a minimum quality of service for a channel, i.e., minimum number of adaptive bitrates, resolutions, frame rate and bitrates. This minimum quality of service will be guaranteed once the ingestion request has been accepted.

(ii) Set a higher quality of service when resources allow, i.e., increased number of adaptive bitrates.

(iii) (iii) Set end-user thresholds that govern the quality of service based on the number of active clients consuming the final content. Typically a higher number of active users will require more adaptive bitrates, due to the fact that statistically there will be more variation in bandwidth (e.g., more people watching over cellular networks, etc.).

(iv) Thresholds based on Electronic Program Guide information and/or other out-of-bound control channels, i.e., a minimum quality of service for sporting events.

(v) Latency thresholds for a channel. Lower latency may require additional resources to simultaneously decode the raw source and subsequently encode.

As one skilled in the art may appreciate, these types of thresholds and traps may advantageously allow the overall system to actively manage an appropriate quality of service at any given time.

Further, an example SDMP system may support both seamless and non-seamless redundancy due to the scalable and distributed nature of the overall architecture. By way of illustration, the following types of redundancy may be implemented:

(i) Automatic replacement of out of service TPUs, PPUs, and CSUs. The ORM entity will monitor in-services entities and spin up new resources if it detects a failure.

(ii) Where resources are constrained, the ORM entity may reduce other services down to their minimum quality of service so that resources can be freed to replace failed entities.

(iii) For seamless failover, duplicate TPUs, PPUs, and CSUs could be created that remain in an active mode that either upload to alternative CSU location(s) or are ready to switch over seamlessly.

Figure 11:
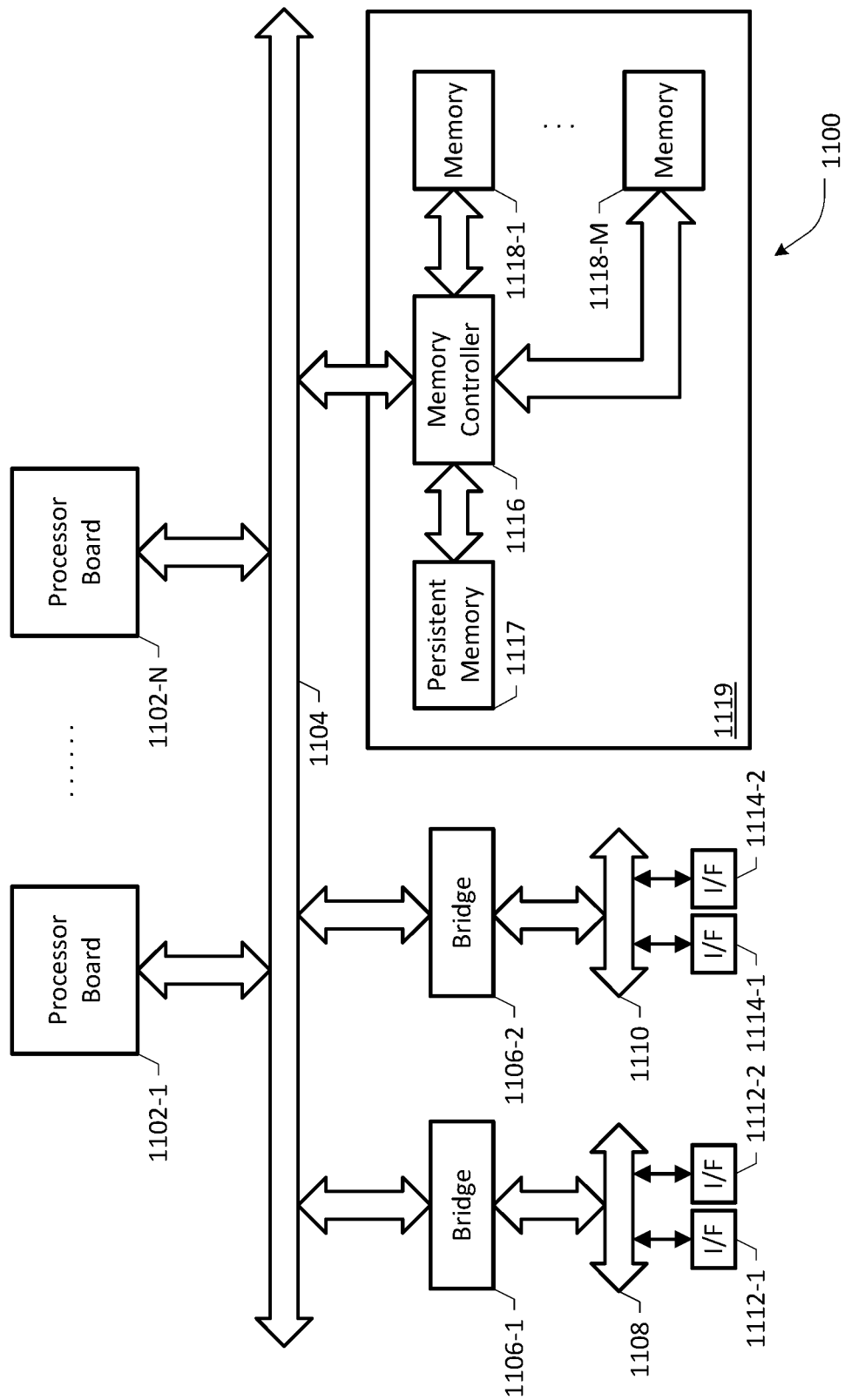
FIG. 11 depicts a block diagram of a distributed hardware platform that may be configured to effectuate one or more media processing units and/or other subsystems of an SDMP architecture of the present patent application according to an embodiment.

Referring now to FIG. 11, depicted therein is a block diagram of a distributed hardware platform 1100 that may be configured to effectuate an element of an example SDMP architecture according to an embodiment. It should be appreciated that the platform 1100 may be individualized and/or virtualized to operate as a TPU, PPU or an ORM subsystem, or any combination/subcombination thereof. One or more processors or processor boards 1102-1 to 1102-N coupled to a bus structure 1104 may be provided for supporting distributed processing and overall control of the platform 1100. Bus 1104 may be coupled to one or more bus bridges or bus controllers 1106-1, 1106-2 for extending to or coupling to additional or peripheral buses 1108, 1110, which in turn may support a plurality of interfaces (I/F). In one realization, one or more of such interfaces may effectuate interfacing with internal and external databases, content providers, internal entities such as other TPUs, PPUs and private CSUs. Additionally, one or more interfaces may support trigger signal interfacing with internal and/or external networks and entities. By way of illustration, I/F 1112-1/1112-2 and 1114-1/1114-2 are representative of such interfaces operative in an example implementation.

A memory subsystem 1119 provided with the platform 1100 may include one or more memory controllers 1116 for controlling memory operations relative to a plurality of memory modules 1118-1 to 1118-M as well as nonvolatile memory modules such as persistent memory module 1117. In accordance with the teachings of the present disclosure, program instructions, which may be organized and/or executed as one or more software processes, modules, blocks, routines, threads, etc. may be stored in or uploaded/downloaded into the persistent memory 1117 for effectuating media processing logic and/or one or more functionalities of TPUS, PPUs or ORM subsystem. A non-transitory computer-readable medium containing instructions thereon may therefore be embodied as part of persistent memory module 1117, which instructions may be executed to effectuate the various functionalities in an individualized realization of the platform 1100, including executing SDMP logic as well as suitable application processes, for example.

Based on the foregoing Detailed Description, it should be appreciated that embodiments of the present invention can allow providers to maximize investment in a number of ways as set forth in a non-exhaustive list below:

Dynamically add/remove bitrates.

Dynamically add/remove uploads to cloud storage.

Use analytics to determine if additional bitrates should be added/removed (e.g., to accommodate growth of audience, improve quality, etc.).

Use analytics to shift resources (i.e., from 3G bitrates to Wi-Fi bitrates per demand; higher granularity of available bitrates based on large demand and availability of bandwidth).

Schedule higher quality events (i.e. the Sunday night game).

Locating resources (e.g., TPU/PPU) in the cloud.

Fast warm startup (i.e., low-bit transcode running but no segmentation/upload occurring).

Redundancy (e.g., have low-bitrate backup channels running that can be ramped up, etc.).

Allocating resources and configuring based on a variety of inputs, including the following examples: (1) programming information from an Electronic Program Guide (EPG); (2) user profile information such as location, service level agreement (SLA), etc.; (3) information from processing units regarding changes in performance (e.g., internal adjustments for power management).

Provides an I/O hardware abstraction for transcoding functionality.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A media delivery method, comprising:
   receiving, at a network node, a source media stream;
   responsive to the network node determining that processing of the source media stream is required:
      dynamically configuring and instantiating:
         a plurality of transcoding processing units that are sequentially connected to one another such that each subsequent transcoding processing unit receives an input segment stream from an upstream transcoding processing unit and generates one or more output segment streams having encoding bitrates that are different from an encoding bitrate of the input segment stream; and
         one or more packager processing units;
      processing the source media stream into one or more levels of work product segments having different media characteristics using the dynamically instantiated plurality of transcoding processing units;
      packaging the one or more levels of work product segments into one or more final work product segments having select media characteristics by the dynamically instantiated one or more packager processing units; and
      uploading the one or more final work product segments having been packaged by the dynamically instantiated one or more packager processing units to one or more storage nodes for delivery to a plurality of end stations over a media streaming network; and
   responsive to the network node determining that the source media stream is segmented and encoded at one or more bitrates acceptable for delivery, avoiding the instantiation of the plurality of transcoding processing units and the processing of the source media stream into one or more levels of work product segments by the plurality of transcoding processing units.

2. The media delivery method as recited in claim 1, further comprising:
   packaging the source media stream into final work product segments and uploading the final work product segments packaged from the source media stream to the one or more storage nodes.

3. The media delivery method as recited in claim 1, wherein the select media characteristics comprise at least one of: multiple encoding bitrates, segment sizes and frame rates.

4. The media delivery method as recited in claim 1, wherein the dynamically instantiated plurality of transcoding processing units and the dynamically instantiated one or more packager processing units are dynamically configured and instantiated based on one or more configuration triggers generated responsive to at least one of: (i) network analytics relative to the delivery of the final work product segment streams to the end stations, (ii) service operator-initiated alarms, (iii) hardware or software failures of the media streaming network, and (iv) an Electronic Program Guide (EPG) containing scheduling information of the source media stream targeted to a geographical area associated with at least a subset of the plurality of end stations.

5. The media delivery method as recited in claim 4, further comprising processing the one or more configuration triggers by an orchestration and resource management (ORM) module associated with the media streaming network.

6. The media delivery method as recited in claim 1, wherein the encoding bitrates of respective one or more output segment streams generated by each transcoding processing unit of the plurality of transcoding processing units are lower than the encoding bitrate of a respective input segment stream received by each transcoding processing unit.

7. The media delivery method as recited in claim 1, wherein the source media stream is received from a multicast domain and the final work products are packaged for delivery over the media streaming network disposed in an HyperText Transfer Protocol (HTTP) domain.

8. A network node configured for facilitating media delivery, the network node comprising:
   one or more processors; and
   one or more persistent memory modules coupled to the one or more processors, the one or more persistent memory modules having program instructions stored thereon which, when executed by the one or more processors, are configured to:
      responsive to determining that processing of a source media stream is required:
         dynamically configuring and instantiating:
            a plurality of transcoding processing units that are sequentially connected to one another such that each subsequent transcoding processing unit receives an input segment stream from an upstream transcoding processing unit and generates one or more output segment streams having encoding bitrates that are different from an encoding bitrate of the input segment stream; and
            one or more packager processing units;
         processing the source media stream into one or more levels of work product segments having different media characteristics using the dynamically instantiated plurality of transcoding processing units;

packaging the one or more levels of work product segments into one or more final work product segments having select media characteristics by the dynamically instantiated one or more packager processing units; and causing to upload the one or more final work product segments packaged by the dynamically instantiated one or more packager processing units to one or more storage nodes for delivery to a plurality of end stations over a media streaming network; and responsive to determining that the source media stream is segmented and encoded at one or more bitrates acceptable for delivery, avoiding the instantiation of the plurality of transcoding processing units and the processing of the source media stream into one or more levels of work product segments by the plurality of transcoding processing units.

9. The network node as recited in claim 8, wherein the program instructions further comprise instructions configured to perform:

packaging the source media stream into final work product segments and uploading the final work product segments packaged from the source media stream to the one or more storage nodes.

10. The network node as recited in claim 8, wherein the select media characteristics comprise at least one of: multiple encoding bitrates, segment sizes and frame rates.

11. The network node as recited in claim 8, wherein the dynamically instantiated plurality of transcoding processing units and the dynamically instantiated one or more packager processing units are dynamically configured and instantiated based on one or more configuration triggers generated responsive to at least one of: (i) network analytics relative to the delivery of the final work product segment streams to the end stations, (ii) service operator-initiated alarms, (iii) hardware or software failures of the media streaming network, and (iv) an Electronic Program Guide (EPG) containing scheduling information of the source media stream targeted to a geographical area associated with at least a subset of the plurality of end stations.

12. The network node as recited in claim 11, further including an orchestration and resource management (ORM) module for processing the one or more configuration triggers.

13. The network node as recited in claim 8, wherein the encoding bitrates of respective one or more output segment streams generated by each transcoding processing unit of the plurality of transcoding processing units are lower than the encoding bitrate of a respective input segment stream received by each transcoding processing unit.

14. The network node as recited in claim 8, wherein the source media stream is received from a multicast domain and the final work products are packaged for delivery over the media streaming network disposed in an HyperText Transfer Protocol (HTTP) domain.

15. A non-transitory tangible computer-readable medium having program instructions stored thereon, which are configured to perform following acts when executed by one or more processors of a network node:

responsive to determining that processing of a source media stream is required:

dynamically configuring and instantiating:

a plurality of transcoding processing units that are sequentially connected to one another such that each subsequent transcoding processing unit receives an input segment stream from an upstream transcoding processing unit and generates one or more output segment streams having encoding bitrates that are different from an encoding bitrate of the input segment stream; and one or more packager processing units;

processing the source media stream into one or more levels of work product segments having different media characteristics using the dynamically instantiated plurality of transcoding processing units; and packaging the one or more levels of work product segments into one or more final work product segments having select media characteristics by the dynamically instantiated one or more packager processing units; and uploading the one or more final work product segments packaged by the dynamically instantiated one or more packager processing units to one or more storage nodes for delivery to a plurality of end stations over a media streaming network; and responsive to determining that the source media stream is segmented and encoded at one or more bitrates acceptable for delivery, avoiding the instantiation of the plurality of transcoding processing units and the processing of the source media stream into one or more levels of work product segments by the plurality of transcoding processing units.

16. The non-transitory tangible computer-readable medium as recited in claim 15, wherein the program instructions further comprise instructions configured to perform:

packaging the source media stream into final work product segments and uploading the final work product segments packaged from the source media stream to the one or more storage nodes.

17. The non-transitory tangible computer-readable medium as recited in claim 15, wherein the select media characteristics comprise at least one of: multiple encoding bitrates, segment sizes and frame rates.

18. The non-transitory tangible computer-readable medium as recited in claim 15, wherein the dynamically instantiated plurality of transcoding processing units and the dynamically instantiated one or more packager processing units are dynamically configured and instantiated based on one or more configuration triggers generated responsive to at least one of: (i) network analytics relative to the delivery of the final work product segment streams to the end stations, (ii) service operator-initiated alarms, (iii) hardware or software failures of the media streaming network, and (iv) an Electronic Program Guide (EPG) containing scheduling information of the source media stream targeted to a geographical area associated with at least a subset of the plurality of end stations.

19. The non-transitory tangible computer-readable medium as recited in claim 15, wherein the encoding bitrates of respective one or more output segment streams generated by each transcoding processing unit of the plurality of transcoding processing units are lower than the encoding bitrate of a respective input segment stream received by each transcoding processing unit.

20. The non-transitory tangible computer-readable medium as recited in claim 15, wherein the source media stream is received from a multicast domain and the final work products are packaged for delivery over the media streaming network disposed in an HyperText Transfer Protocol (HTTP) domain.

* * * * *